(12) United States Patent
Zheng

(10) Patent No.: US 12,269,246 B2
(45) Date of Patent: Apr. 8, 2025

(54) WATERPROOF AND WEAR-RESISTANT COMPOSITE FLOOR AND PRODUCTION METHOD

(71) Applicant: Victory Solutions Ltd., Mahe (SC)

(72) Inventor: Sumei Zheng, Dong Guan (CN)

(73) Assignee: Victory Solutions Ltd.

( * ) Notice: Subject to any disclaimer, the term of this patent is extended or adjusted under 35 U.S.C. 154(b) by 8 days.

(21) Appl. No.: 17/253,380

(22) PCT Filed: Dec. 18, 2018

(86) PCT No.: PCT/CN2018/121649
§ 371 (c)(1),
(2) Date: Dec. 17, 2020

(87) PCT Pub. No.: WO2020/124342
PCT Pub. Date: Jun. 25, 2020

(65) Prior Publication Data
US 2021/0309003 A1  Oct. 7, 2021

(51) Int. Cl.
*B32B 38/00* (2006.01)
*B32B 3/06* (2006.01)
(Continued)

(52) U.S. Cl.
CPC ............ *B32B 38/0008* (2013.01); *B32B 3/06* (2013.01); *B32B 3/266* (2013.01); *B32B 7/12* (2013.01);
(Continued)

(58) Field of Classification Search
CPC . B32B 38/0008; B32B 38/0036; B32B 38/04; B32B 3/266; B32B 7/12;
(Continued)

(56) References Cited

U.S. PATENT DOCUMENTS

| 8,365,488 B2 | 2/2013 | Chen | |
|---|---|---|---|
| 2009/0053448 A1* | 2/2009 | Paiva | C08J 7/046 428/483 |

(Continued)

FOREIGN PATENT DOCUMENTS

| CN | 101379254 A | 3/2009 |
|---|---|---|
| CN | 104589677 A | 5/2015 |

(Continued)

*Primary Examiner* — Michael Zhang
(74) *Attorney, Agent, or Firm* — Lewis Anten, Esq.; Lewis Anten, P.C.

(57) ABSTRACT

A production method for a waterproof and wear-resistant composite floor, comprising: first manufacturing a PVC composite layer preform (3); then performing a corona treatment and a punching treatment on a soft cushion layer (2); and finally, compounding, at one time, the PVC composite layer preform (3), the soft cushion layer (2) and a waterproof substrate layer (1) into one. Said process is simple and easy to implement, shortening the production cycle, reducing the manpower and material resources required by the production process and reducing the production cost; moreover, the waterproof and wear-resistant composite floor produced has a simple structure, and also has very good waterproof and wear-resistant performance; in addition, the waterproof and wear-resistant composite floor will not swell, and will also not split into layers or deform easily.

1 Claim, 2 Drawing Sheets

(51) Int. Cl.
- *B32B 3/26* (2006.01)
- *B32B 7/12* (2006.01)
- *B32B 27/08* (2006.01)
- *B32B 27/30* (2006.01)
- *B32B 27/32* (2006.01)
- *B32B 37/12* (2006.01)
- *B32B 38/04* (2006.01)
- *E04F 15/02* (2006.01)
- *E04F 15/10* (2006.01)

(52) U.S. Cl.
CPC ............ *B32B 27/08* (2013.01); *B32B 27/304* (2013.01); *B32B 27/306* (2013.01); *B32B 27/32* (2013.01); *B32B 37/12* (2013.01); *B32B 38/0012* (2013.01); *B32B 38/0036* (2013.01); *B32B 38/04* (2013.01); *E04F 15/107* (2013.01); *B32B 2038/0016* (2013.01); *B32B 2038/042* (2013.01); *B32B 2255/10* (2013.01); *B32B 2307/554* (2013.01); *B32B 2307/7265* (2013.01); *B32B 2310/028* (2013.01); *B32B 2310/14* (2013.01); *B32B 2419/04* (2013.01); *E04F 15/02038* (2013.01); *E04F 2201/043* (2013.01); *E04F 2290/044* (2013.01)

(58) Field of Classification Search
CPC ..... B32B 27/08; B32B 27/304; B32B 27/306; B32B 27/32; B32B 27/12; B32B 2038/0016; B32B 2038/042; B32B 2255/10; B32B 2307/554; B32B 2307/265; B32B 2310/028; B32B 2310/14; B32B 2419/04; E04F 15/107
See application file for complete search history.

(56) References Cited

U.S. PATENT DOCUMENTS

| | | | |
|---|---|---|---|
| 2014/0227475 A1* | 8/2014 | Yu | B32B 5/00 428/86 |
| 2016/0083965 A1* | 3/2016 | Baert | B29C 65/4805 52/309.1 |
| 2017/0022388 A1 | 1/2017 | Zhang | |
| 2019/0024384 A1* | 1/2019 | Van Giel | C08K 3/26 |
| 2019/0153734 A1* | 5/2019 | Van Vlassenrode | B29C 43/48 |

FOREIGN PATENT DOCUMENTS

| | | |
|---|---|---|
| CN | 106132706 A | 11/2016 |
| CN | 108099338 A | 6/2018 |

\* cited by examiner

WATERPROOF AND WEAR-RESISTANT COMPOSITE FLOOR AND PRODUCTION METHOD

TECHNICAL FIELD

The invention relates to the technical field of composite floors, and particularly relates to a waterproof wear-resistant composite floor and a production method.

BACKGROUND

The composite floor is formed by adhering and compositing a plurality of different material layers in sequence through glue, and the material layers of the composite floor include a wear-resistant layer on the surface, a plastic layer in the middle, and a substrate layer which is positioned at the bottom layer ad is treated as a main body layer; and the substrate layer is a wood-plastic layer or a stone-plastic layer. The current processing technology of the composite floor only comprises simple gluing, hot pressing and pressure maintaining and specifically comprises the steps of pressing and attaching corresponding material layers on the surface of the substrate layer in sequence, namely, roller-coating glue on the attached surfaces of adjacent two material layers, and then performing hot pressing and pressure maintaining to obtain the composite floor.

The following shortcomings currently still need to solve:

1. A traditional production process has many steps, and requires multiple hot pressing and long-term pressure maintaining processing, and pressure is to be maintained for 12-24 h after each hot pressing. The energy consumption of the traditional production process is large, the production cycle is long, the effective efficiency is low, and the production cost is high.

2. During the hot pressing process, the middle plastic layer cannot exhaust the air existing in the middle area. After press-attaching operation, various bulges are often formed in the hollow area, which seriously affects the quality and life of the composite floor. And 3. Due to different material characteristics between different materials, the coefficients of thermal expansion and contraction are also different. During the production process, different material layers have different degrees of internal stress, and glue is used as a binder, all material layers of the composite floor are easily layered. After the composite floor is put into use for a period of time, the surrounding area of the composite floor is prone to warping, and the waterproof performance is also very poor.

SUMMARY

In view of the shortcomings of the prior art, the first purpose of the invention is to provide a production method of a waterproof and wear-resistant composite floor. The production method of the waterproof and wear-resistant composite floor is simple in process and easy to implement, the production period is shortened, manpower and material resources required in the production process are reduced, and the production cost is reduced;

In view of the shortcomings of the prior art, the second purpose of the invention is to provide a waterproof and wear-resistant composite floor, which has a simple structure and good waterproof and wear-resistant properties, and is not easy to bulge and layer or deform.

In order to achieve the purpose, according to the technical scheme, the production method of the waterproof and wear-resistant composite floor comprises the following steps:

manufacturing of a PVC composite layer prefabricated part, wherein the step comprises the following sub-steps:

a), compositing a PVC composite layer blank part, namely, conveying a PVC wear-resistant layer, a PVC pattern layer and a PVC plastic layer to a hot-pressing device for hot-pressing compositing, wherein the PVC wear-resistant layer is stacked above the PVC pattern layer, and the PVC pattern layer is stacked above the PVC plastic layer; and performing hot-pressing compositing on the PVC wear-resistant layer, the PVC pattern layer and the PVC plastic layer by virtue of the hot-pressing device to obtain an integrated composite sheet or composite film material, thereby obtaining the PVC composite layer blank part.

b), performing corona treatment on the PVC composite layer blank part, namely, conveying the PVC composite layer blank part to a corona processing device, and carrying out corona treatment on the upper surface and/or the lower surface of the PVC composite layer blank part, so that a first corona microporous surface is formed on the upper surface and/or the lower surface of the PVC composite layer blank part, micro-holes with the diameter of 0.01-0.1 mm are fully distributed in the upper surface and/or the lower surface of the PVC composite layer blank part, and the depth of the micro-holes of the PVC composite layer blank part extending to the PVC composite layer blank part is 0.01-0.1 mm;

c), coating UV paint on the PVC composite layer blank part, namely, roller-coating or spraying UV paint on the upper surface of the PVC composite layer blank part subjected to corona treatment, so that a UV paint layer is formed;

d), carrying out heat treatment on the PVC composite layer blank part, namely, heating the PVC composite layer blank part at the temperature of 80-120 DEG C. for 1-10 minutes, and then placing the PVC composite layer blank part in a temperature environment with the temperature of 10-25 DEG C. for cooling at normal temperature, and rapidly cooling the PVC composite layer blank part for 1-10 minutes; and e), carrying out curing treatment on the PVC composite layer blank part, namely, placing or stacking the PVC composite layer blank part subjected to heat treatment in a curing bin, curing for at least 24 hours to obtain a PVC composite layer prefabricated part (3), and placing aside for later use;

primary corona treatment, namely, conveying a soft cushion layer to the corona processing device, and carrying out corona treatment on the lower surface of the soft cushion layer, so that a second corona microporous surface is formed on the lower surface of the soft cushion layer, the micro-holes with the diameter of 0.01-0.1 mm are fully distributed in the surface of the second corona microporous surface, and the depth of the micro-holes of the second corona microporous surface extending to the soft cushion layer 2 is 0.01-0.1 mm;

cutting, namely, conveying the soft cushion layer subjected to corona treatment to a cutting device for cutting, so that the shape of the soft cushion layer is matched with the shape of the PVC composite layer prefabricated part, or the shape of the soft cushion layer is matched with the shape of a waterproof substrate layer;

sanding treatment of the waterproof substrate layer, namely, conveying the waterproof substrate layer to a sanding device, and sanding the upper surface of the waterproof substrate layer to form a flat sanded surface;

gluing, namely, conveying the waterproof substrate layer to a gluing machine, coating glue on the sanding surface of the waterproof substrate layer, and forming a first glue composite surface on the sanding surface of the waterproof substrate layer;

compositing of the soft cushion layer, namely, attaching the soft cushion layer with the holes to the surface of the waterproof substrate layer, and correspondingly compositing and attaching the second corona microporous surface of the soft cushion layer with the holes to the first glue composite surface of the waterproof substrate layer so as to obtain a primary waterproof substrate composite layer, and placing aside for later use;

ultrasonic compositing treatment of the soft cushion layer, namely, conveying the primary waterproof substrate composite layer to an ultrasonic press which is equipped with an ultrasonic pressing plate, positioning the primary waterproof substrate composite layer to an ultrasonic press-attaching platform, controlling the ultrasonic pressing plate at the upper part of the ultrasonic press-attaching platform to downwards move and press and attach to the soft cushion layer with holes on the primary waterproof substrate composite layer, electrifying the ultrasonic pressing plate, increasing the temperature of the ultrasonic pressing plate to be 80-120 DEG C., starting an ultrasonic generator at the same time, transmitting ultrasonic wave to the ultrasonic pressing plate through an ultrasonic frequency conversion rod mounted at the back of the ultrasonic pressing plate, then transmitting the ultrasonic wave to the soft cushion layer with the holes and a composite interface between the soft cushion layer with the holes and the waterproof substrate layer through the ultrasonic pressing plate, and then performing ultrasonic thermal composition, wherein the ultrasonic thermal composition comprises the following three substeps:

a), glue permeation, namely, controlling the ultrasonic pressing plate to slightly press the soft cushion layer with the holes, and respectively and rapidly permeating the glue into the soft cushion layer with the holes and the waterproof substrate layer under the combined action of temperature and ultrasonic wave;

b), air exhausting, namely, after the glue permeation is finished, gradually increasing the pressure of the ultrasonic pressing plate, and respectively exhausting the air at the connection interface of the soft cushion layer with the holes and the waterproof substrate layer through the micro-holes under the combined action of the pressure and the ultrasonic wave; and c), ultrasonic thermal compositing, namely, after air at the connection interface is exhausted, controlling the ultrasonic pressing plate to keep at a set pressure and temperature, and under the combined action of the temperature, the pressure and ultrasonic waves, enabling the second corona microporous surface to permeate below the surface of the waterproof substrate layer so as to firmly composite the soft cushion layer with the holes on the upper surface of the waterproof substrate layer to obtain a waterproof substrate composite layer;

secondary corona treatment, namely, conveying the waterproof substrate composite layer to the corona device, and carrying out corona treatment on the upper surface of the soft cushion layer above the waterproof substrate composite layer to form a third corona microporous surface, wherein micro-holes with the diameters of 0.01-0.1 mm are fully distributed in the surface of the third corona microporous surface, and the depth of the micro-holes of the third corona microporous surface extending into the soft cushion layer is 0.01-0.1 mm;

secondary gluing treatment, namely, conveying the waterproof substrate composite layer to a glue passing machine immediately after the waterproof substrate composite layer is subjected to secondary corona treatment, and coating glue on the surface of the third corona microporous surface to form a second glue composite surface so that the glue can quickly permeate into the micro-holes of the third corona microporous surface;

compositing treatment, namely, immediately attaching the PVC composite layer prefabricated part subjected to the curing treatment to the waterproof substrate composite layer subjected to the secondary gluing treatment after the secondary gluing treatment is finished, and compositing the first corona microporous surface of the PVC composite layer prefabricated part to the second glue composite surface of the waterproof substrate composite layer to obtain a composite board;

cold pressing treatment, namely, conveying the composite board into a cold press immediately after the compositing processing is finished, adjusting the pressure to 3-15 Mpa, maintaining the pressure for 4-8 hours to obtain a raw composite board, and placing aside for later use;

post processing, namely, performing post processing on the raw composite board, wherein the later-stage post processing comprises at least one of board sawing processing, cutting processing and chase mortise processing; and obtaining finished product of a floor, namely, performing post processing to obtain the finished product of the waterproof wear-resistant composite floor.

1. According to further technical scheme, the waterproof and wear-resistant composite floor comprises the waterproof substrate layer and the soft cushion layer and is characterized by comprising the PVC composite layer prefabricated part which is pre-manufactured and composited by a hot pressing process; the PVC composite layer prefabricated part sequentially comprises the PVC wear-resistant layer, the PVC pattern layer and the PVC plastic layer from top to bottom;

the PVC composite layer prefabricated part subjected to surface corona treatment, the soft cushion layer subjected to surface corona treatment and the waterproof base material layer subjected to sanding treatment are composited together to form the waterproof wear-resistant composite floor through the hot pressing process;

the lower surface of the PVC composite layer prefabricated part and the upper and lower surfaces of the soft cushion layer are respectively and densely distributed with micro-holes of which the upper parts are provided with the contraction type openings and the bottoms mutually communicate; and the upper surface of the soft cushion layer is hot-melt composited on the PVC composite layer prefabricated part, the lower surface of the soft cushion layer is hot-melt composited on the waterproof substrate layer, the grid-shaped composite material bonding layer which is connected into a whole is formed in the layer below the connection surfaces of the soft cushion layer and the waterproof substrate layer.

Compared with the prior art, the waterproof and wear-resistant composite floor and the production method have the following advantages:

1. The production method of the waterproof and wear-resistant composite floor are simple in process and easy to implement; the production circle of the waterproof and wear-resistant composite floor is reduced to 24-48 hours and is reduced by 70%, the production energy consumption is reduced by 70-80%, and the production cost is greatly reduced.

2. The waterproof and wear-resistant composite floor produced by the method has simple structure and very good waterproof and wear-resistant performances, and is not easy to bulge and layer or deform.

BRIEF DESCRIPTION OF DRAWINGS

The present invention will be further described below in conjunction with figures and embodiments.

In figures:
1. Waterproof substrate layer; 11. chase mortise
2. Soft cushion layer 21; composite material bonding layer 22; through hole.
3. PVC composite layer prefabricated part; 31. PVC wear-resistant layer; 32. PVC pattern layer; 33. PVC plastic layer

DETAILED DESCRIPTION

The followings are only preferred embodiments of the present invention and do not limit the protection scope of the present invention.

Embodiment I

Figure 1:
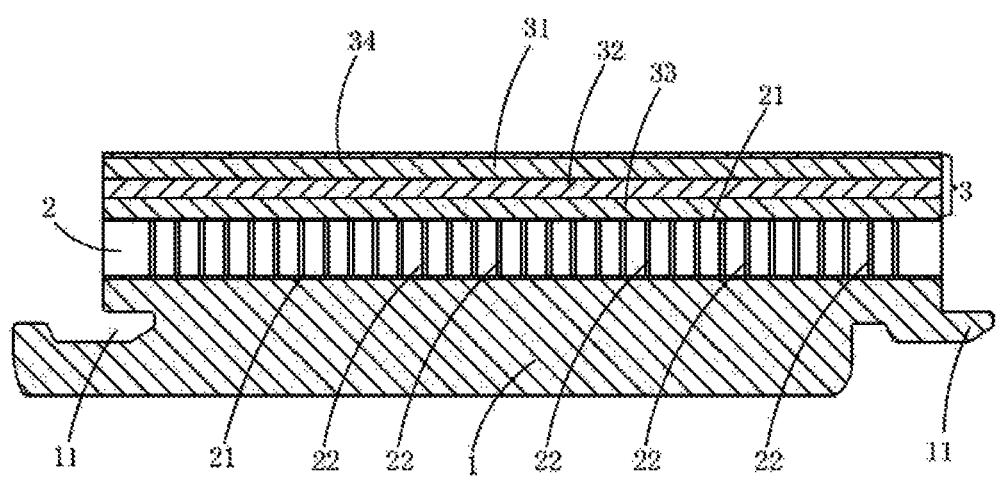
FIG. 1 is a schematic structural diagram of the first type of waterproof and wear-resistant composite floor produced by the production method of the present invention.
Figure 2:
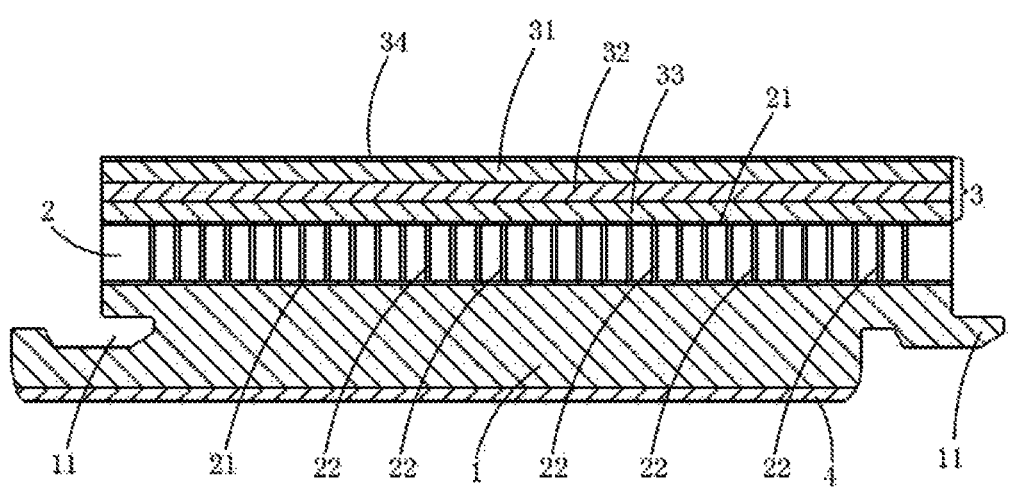
FIG. 2 is a schematic structural diagram of the second type of waterproof and wear-resistant composite floor produced according to the production method of the present invention.

A production method of a waterproof and wear-resistant composite floor, as shown in FIGS. 1 and 2, comprises the following steps:

manufacturing of a PVC composite layer prefabricated part, wherein the step comprises the following sub-steps:

a), compositing a PVC composite layer blank part, namely, conveying a PVC wear-resistant layer 31, a PVC pattern layer 32 and a PVC plastic layer 33 together to a hot-pressing device for hot-pressing compositing, wherein the PVC wear-resistant layer 31 is stacked above the PVC pattern layer 32, and the PVC pattern layer 32 is stacked above the PVC plastic layer 33; and performing hot-pressing compositing on the PVC wear-resistant layer 31, the PVC pattern layer 32 and the PVC plastic layer 33 by virtue of the hot-pressing device to obtain an integrated composite sheet or composite film material, thereby obtaining the PVC composite layer blank part.

b), performing corona treatment on the PVC composite layer blank part, namely, conveying the PVC composite layer blank part to a corona processing device, and carrying out corona treatment on the upper surface of the PVC composite layer blank part, so that a first corona microporous surface is formed on the upper surface of the PVC composite layer blank part, micro-holes with the diameter of 0.01-0.1 mm are fully distributed in the upper surface of the PVC composite layer blank part, and the depth of the micro-holes of the PVC composite layer blank part extending to the PVC composite layer blank part is 0.01-0.1 mm;

preferably, the corona treatment is also carried out on the lower surface of the PVC composite layer blank part, so that a first corona microporous surface is also formed on the lower surface of the PVC composite layer blank part.

c), coating UV paint on the PVC composite layer blank part, namely, roller-coating or spraying UV paint on the upper surface of the PVC composite layer blank part subjected to corona treatment, so that a UV paint layer 34 is formed; and enabling the UV paint to permeate into the first corona microporous surface, so that the UV paint layer 34 can be firmly adhered to the PVC composite layer blank part, wherein a corona surface is formed on the lower surface of the PVC composite layer prefabricated part 3 subjected to surface corona treatment, and micro-holes of which the outer ends are contraction type openings and the bottoms mutually communicate are densely distributed in the lower surface of the PVC composite layer prefabricated part 3 subjected to surface corona treatment;

a glue layer is coated on the upper surface of the soft cushion layer 2, so that the lower surface of the PVC composite layer prefabricated part 3 can be firmly composited to the upper surface of the soft cushion layer 2;

d), carrying out heat treatment on the PVC composite layer blank part, namely, heating the PVC composite layer blank part at the temperature of 80-120 DEG C. for 1-10 minutes, and then transferring the PVC composite layer blank part in a temperature environment with the temperature of 10-25 DEG C. for cooling at normal temperature, rapidly cooling, and removing inner stress of the PVC composite layer blank part by heat treatment, so that the size of the PVC composite layer blank part is stable, and the PVC composite layer blank part can be prevented from warping or deforming in later processing;

in the specific implementation mode, the PVC composite layer blank part is conveyed by a conveyer belt, so that the PVC composite layer blank part sequentially passes through a tunnel oven and a normal-temperature cooling water tank, and the PVC composite layer blank part conveyed out of the tunnel oven is conveyed immediately into the normal-temperature cooling water tank by the conveyer belt to be rapidly cooled for 1-10 minutes; preferably, the rapid cooling time is controlled to be 3-5 minutes, so that the inner stress can be removed, and warping can be prevented;

in the preferred implementation mode, the temperature in the tunnel type oven is controlled to be 80-120 DEG C., and the time of the PVC composite layer blank part passing through the tunnel type oven is controlled to be 1-10 minutes, namely, the PVC composite layer blank part is baked for 1-10 minutes through the oven; preferably, the baking time is controlled to be 3-7 minutes;

in the preferred implementation mode, the temperature of cooling water in the normal-temperature cooling water tank is controlled to be 10-25 DEG C., preferably, the temperature of the cooling water in the normal-temperature cooling water tank is controlled to be 20 DEG C.; the PVC composite layer blank part is partially or completely immersed in the cooling water in the process of conveying the PVC composite layer blank part to pass through the normal-temperature cooling water tank by the conveyer belt, the time for immersing the PVC composite layer blank part in the cooling water is controlled to be 1-10 minutes, namely, the PVC composite layer blank part is cooled for 1-10 minutes in a water cooling mode; and temperature of the PVC composite layer blank part is quickly decreased to the normal temperature in the water cooling mode;

in the preferred implementation mode, after being removed from the normal-temperature cooling water tank, the PVC composite layer blank part is rapidly dried in a blowing mode, specifically the PVC composite layer blank part is blown by a fan, so that water on the surface layer of the PVC composite layer blank part can be quickly dried and removed by blowing;

e), carrying out curing treatment on the PVC composite layer blank part, namely, placing or stacking the PVC composite layer blank part subjected to heat treatment in a curing bin, curing for at least 24 hours to obtain a PVC composite layer prefabricated part 3, and placing aside for later use, wherein little inner stress in the PVC composite layer blank part can be removed by curing treatment, so that warping is prevented from in later processing, and meanwhile, the warping caused by inner stress of a finished in use can also be prevented;

primary corona treatment, namely, conveying the soft cushion layer 2 to the corona processing device, and carrying out corona treatment on the lower surface of the soft cushion layer 2, so that a second corona microporous surface is formed on the lower surface of the soft cushion layer 2, the micro-holes with the diameter of 0.01-0.1 mm are fully distributed in the surface of the second corona microporous surface, and the depth of the micro-holes of the second corona microporous surface extending to the soft cushion layer 2 is 0.01-0.1 mm;

a corona platform is arranged on the corona device; a cross arm capable of moving back and forth along the corona platform is arranged at the upper part of the corona device; the cross arm transversely crosses over the conveying platform; at least one row of corona units is arranged on the cross arm; a plurality of corona spray heads are closely arranged in the first row of corona units; and the bottom surface of each corona spray head is provided with densely arranged fiber bundles;

in the corona process, the distance from the bottom surface of each corona spray head to the soft cushion layer 2 placed on the corona platform is controlled to be 0.5-5 cm, and the cross arm is controlled to move along the conveying platform so as to enable each corona spray head to move from one side of the corona platform to the other side;

in the corona process, high-frequency alternating voltage is provided for the corona units, the bottom surface of each corona spray head faces the corona platform to continuously spray dense corona, the corona emitted by the corona spray heads punctures the surface of the soft cushion layer 2, so that dense micro holes are formed in the surface of the soft cushion layer 2, and the corona treatment of the upper surface of the soft cushion layer 2 is realized;

in preferred implementation mode, a metal supporting plate serving as the corona platform is fixed on the corona device; the metal supporting plate is electrically connected with a direct current positive electrode; and the surface voltage of the metal supporting plate is controlled to be 0.5-48V;

an ultrasonic frequency conversion rod is fixed on the upper part of each corona unit; each corona spray head is respectively arranged as an ultrasonic directional emission head; ultrasonic waves are respectively provided for each ultrasonic frequency conversion rod through the ultrasonic generator so as to realize transmit ultrasonic waves to each corona unit; first ultrasonic waves are respectively emitted towards the metal supporting plate through each corona spray head in a directional manner; and the corona emitted by each corona spray head is mutually overlapped with the first ultrasonic waves emitted by the corona spray head;

the first ultrasonic wave is reflected by the metal supporting plate, so that the reflected first ultrasonic wave is converged in the soft cushion layer 2 and generates a cavitation effect in the soft cushion layer 2, and the sidewall of each cavity is crushed into powder by the cavitation effect. Preferably, the inside of each cavity remains soft cushion layer 2 powder formed by cavitation crushing of the side wall of the cavity;

in the ultrasonic composite treatment of the soft cushion layer 2, the glue is respectively permeated into each corresponding cavity, and the glue and the soft cushion layer 2 powder are respectively permeated into fiber gaps below the surface of the corresponding waterproof substrate layer 1, so that a grid-shaped composite material bonding layer 21 which is connected into a whole is respectively formed in the layer below the surface of the soft cushion layer 2 and the layer below the surface of the waterproof substrate layer 1;

the first ultrasonic wave reflected by the metal supporting plate, the first ultrasonic wave emitted in the forward direction and the corona emitted in the forward direction form an impact interface on the upper surface of the soft cushion layer 2 through the metal supporting plate with positive voltage, so that the generation area of the cavitation effect can be intensively controlled in the layer below the upper surface of the soft cushion layer 2, and dense micro-cavities are generated in the layer 0.01-0.1 mm below the upper surface of the soft cushion layer;

each micro-hole formed in the upper surface of the soft cushion layer 2 is provided with a cavity and a contraction type opening; each cavity and each contraction type opening are mainly generated by corona breakdown; the first ultrasonic wave generates cavitation effect in each cavity to enlarge the volume of each cavity; and the size of each contraction type opening is kept unchanged in the cavity enlarging process;

the local side wall of each micro-cavity is broken down by the cavitation effect and the corona; at least one micro-continuous through hole is formed in the side wall of each cavity, so that the cavities of the micro-holes communicate with each other locally, and the contraction type openings at the upper parts of the micro-holes still keep complete side walls to separate the micro-holes respectively;

the cavities of adjacent through holes 22 communicate with the through holes 22, so that the cavities of all micro-holes in the surface of the soft cushion layer 2 respectively communicate with the corresponding through holes 22 through the corresponding micro continuous through holes so as to form a three-dimensional air exhausting network by interconnecting micro exhausting gaps, the micro-holes and the through holes 22. Air in the soft cushion layer and the connection interface can be quickly exhausted through the through holes 22, so that air is prevented from reserving in the connection interface or the layer nearby, and as a result, the waterproof and wear-resistant composite floor is effectively prevented from bulging. Specifically, the diameter or width of the through holes 22 is 2-20 mm, preferably, the diameter or width of the through holes 22 is 5-10 mm;

cutting, namely, conveying the soft cushion layer 2 subjected to corona treatment to a cutting device for cutting, so that the shape of the soft cushion layer 2 is matched with the shape of the PVC composite layer prefabricated part 3, or the shape of the soft cushion layer 2 is matched with the shape of a waterproof substrate layer 1;

punching treatment, namely, conveying the soft cushion layer 2 to a punching device for punching, wherein at least the middle area of the soft cushion layer 2 is fully distributed with a plurality of through holes 22, and the through holes 22 respectively penetrate through the soft cushion layer 2 up and down so as to obtain the soft cushion layer with the holes;

the soft cushion layer 2 is made of EVA sheets or EVA film materials, IXPE sheets, IXPE film materials, IXPP sheets, IXPP film materials, PP sheets, PP film materials, PVC sheets, PVC film materials;

preferably, the soft cushion layer 2 is preferably made of the EVA sheets or the EVA film materials; and the through holes 22 are fully distributed in the middle of the soft cushion layer 2 by punching treatment;

sanding treatment of the waterproof substrate layer, namely, conveying the waterproof substrate layer 1 to a sanding device, and sanding the upper surface of the waterproof substrate layer 1 to form a flat sanded surface;

dust removing, namely, blowing away dust on the sanding surface of the waterproof substrate layer by using an air gun, or sweeping through a brush or absorbing dust on the surface of the sanding surface of the waterproof substrate layer, or collecting dust on the surface of the sanding surface of the waterproof substrate layer through a dust collection device, so as to prevent dust from flying everywhere, then coating a layer of silane coupling agent diluent on the sanding surface in a roller-coating or spraying manner, diluting the silane coupling agent and water in proportion to obtain silane coupling agent diluent, wherein the weight percentage of the silane coupling agent in the silane coupling agent diluent is 1-5%;

drying, namely, drying the sanded surface subjected to the dust removing step, wherein the drying temperature is controlled to be 80-100 DEG C., and the drying time is controlled to be 5-15 minutes. Water in the silane coupling agent diluent coated on the sanding surface can be removed by the drying treatment, a thin silane coupling agent bonding layer composed of the silane coupling agent is formed on the surface of the sanding surface and permeates below the surface of the sanding surface, and the silane coupling agent bonding layer improves the compositing firmness between the waterproof substrate layer and the soft cushion layer with the holes. Compared with a technical scheme without the silane coupling agent bonding layer, the technical scheme with the silane coupling agent bonding layer can increase the compositing firmness by 2 to 4 times;

gluing treatment, namely, conveying the waterproof substrate layer 1 to a gluing machine, coating glue on the sanding surface of the waterproof substrate layer 1, and forming a first glue composite surface on the sanding surface of the waterproof substrate layer 1;

compositing of the soft cushion layer, namely, attaching the soft cushion layer with the holes to the surface of the waterproof substrate layer 1, and correspondingly compositing and attaching the second corona microporous surface of the soft cushion layer with the holes to the first glue composite surface of the waterproof substrate layer 1 so as to obtain a primary waterproof substrate composite layer, and placing aside for later use;

ultrasonic compositing treatment of the soft cushion layer, namely, conveying the primary waterproof substrate composite layer to an ultrasonic press which is equipped with an ultrasonic pressing plate, positioning the primary waterproof substrate composite layer to an ultrasonic press-attaching platform, controlling the ultrasonic pressing plate at the upper part of the ultrasonic press-attaching platform to downwards move and press and attach to the soft cushion layer with holes on the primary waterproof substrate composite layer, electrifying the ultrasonic pressing plate, increasing the temperature of the ultrasonic pressing plate to be 80-120 DEG C., starting an ultrasonic generator at the same time, transmitting ultrasonic wave to the ultrasonic pressing plate through an ultrasonic frequency conversion rod mounted at the back of the ultrasonic pressing plate, then transmitting the ultrasonic wave to the soft cushion layer with the holes and a composite interface between the soft cushion layer with the holes and the waterproof substrate layer 1 through the ultrasonic pressing plate, and then performing ultrasonic thermal composition, wherein the ultrasonic thermal composition comprises the following three substeps:

a, glue permeation, namely, controlling the ultrasonic pressing plate to slightly press the soft cushion layer with the holes, and respectively and rapidly permeating the glue into the soft cushion layer with the holes and the waterproof substrate layer 1 under the combined action of temperature and ultrasonic wave;

specifically, the pressure of the ultrasonic press plate on the soft cushion layer with the holes is controlled to be 0.5-0.8 Mpa; the ultrasonic waves are transmitted into the glue to generate mechanical effect and warm-heat effect under the action of the temperature and the ultrasonic waves, thus the molecular motion of water molecules and high molecular compounds in the glue is improved, the glue is softened while the temperature of the glue is increased, and the fluidity of the glue is improved; the ultrasonic waves are transmitted into the glue to generate physicochemical effect simultaneously, dispersion effect and thixotropy effect are generated on the glue, and the permeability of the soft cushion layer with the holes and the glue is improved by the dispersion effect; the glue is differentiated into small-particle-diameter particles of 0.01-0.1 mm by the thixotropy effect, thus the glue is respectively and rapidly penetrated into the micro-holes on the second corona microporous surface and the fiber gaps below the surface of the waterproof substrate layer 1, and the composite material bonding layer 21 which is formed by mutually permeating the soft cushion layer 2 powder, glue, fibers in the waterproof substrate layer (1) and fillers in the waterproof substrate layer 1 and is connected into a whole is formed below the surface of the waterproof substrate layer 1;

the waterproof substrate layer 1 is the waterproof composite board, and the waterproof composite board includes at least one of a wood-plastic board, a stone-plastic board and a waterproof composite wood board;

on the basis of the material layer structure, the waterproof composite board can be a board with a single-layer structure or a composite board with a structure having at least two layers;

preferably, the waterproof substrate layer 1 is made of the wood-plastic board, the stone-plastic board and the waterproof composite board;

the waterproof substrate layer 1 can also be made of the plastic board; the upper surface of the plastic board is subjected to corona treatment before performing ultrasonic compositing treatment on the soft cushion layer 2, so that the micro-holes can be distributed in the whole surface of the plastic board, and the treatment process is the same as the primary corona treatment.

b, air exhausting, namely, after the glue permeation is finished, gradually increasing the pressure of the ultrasonic pressing plate, and respectively exhausting the air at the connection interface of the soft cushion layer with the holes and the waterproof substrate layer 1 through the micro-holes 22 under the combined action of the pressure and the ultrasonic wave, specifically, the pressure of the ultrasonic pressure plate is gradually increased and is controlled to be 0.5-2 Mpa, and under the action of pressure and ultrasonic waves, air is exhausted from one surface, attached to the waterproof substrate layer 1, of the soft cushion layer with the holes through various micro-holes and the through holes 22 so as to avoid bulging between the soft cushion layer with the holes and the waterproof substrate layer 1;

c, ultrasonic thermal compositing, namely, after air at the connection interface is exhausted, controlling the ultrasonic pressing plate to keep at a set pressure and temperature, and under the combined action of the temperature, the pressure and ultrasonic waves, enabling the second corona microporous surface to permeate below the surface of the waterproof substrate layer 1 so as to firmly composite the soft cushion layer with the holes on the upper surface of the waterproof substrate layer 1 to obtain a waterproof substrate composite layer;

specifically, powder and glue permeating into each soft cushion layer 1 and the fillers in the waterproof substrate layer 1 are converted into slightly-molten state under the combined action of temperature, pressure and ultrasonic waves so as to form a composite material mixing layer, then the composite material mixing layer is cured during pressure maintaining to finally form the composite material bonding layer 21, and thus the soft cushion layer with the holes can be firmly composited to the upper surface of the waterproof substrate layer 1 to obtain the waterproof substrate composite layer;

secondary corona treatment, namely, conveying the waterproof substrate composite layer to the corona device used in the primary corona treatment, and carrying out corona treatment on the upper surface of the soft cushion layer 2 above the waterproof substrate composite layer to form a third corona microporous surface, wherein micro-holes with the diameters of 0.01-0.1 mm are fully distributed in the surface of the third corona microporous surface, and the depth of the micro-holes of the third corona microporous surface extending into the soft cushion layer 2 is 0.01-0.1 mm;

secondary gluing treatment, namely, conveying the waterproof substrate composite layer to a glue passing machine immediately after the waterproof substrate composite layer is subjected to secondary corona treatment, and coating glue on the surface of the third corona microporous surface to form a second glue composite surface so that the glue can quickly permeate into the micro-holes of the third corona microporous surface;

compositing treatment, namely, immediately attaching the PVC composite layer prefabricated part 3 subjected to the curing treatment to the waterproof substrate composite layer subjected to the secondary gluing treatment after the secondary gluing treatment is finished, and compositing the first corona microporous surface of the PVC composite layer prefabricated part 3 to the second glue composite surface of the waterproof substrate composite layer to obtain a composite board;

cold pressing treatment, namely, conveying the composite board into a cold press immediately after the compositing processing is finished, adjusting the pressure to 3-15 Mpa, maintaining the pressure for 4-8 hours to obtain a raw composite board, and placing aside for later use;

specifically, the cold press is provided with an ultrasonic cold pressing platform; an ultrasonic cold pressing plate is arranged at the upper part of the ultrasonic cold pressing platform; the composite board is positioned on the ultrasonic cold pressing platform; the ultrasonic cold pressing plate is controlled to move downwards and is pressed and attached to the back of the composite board; the pressure of the ultrasonic cold pressing plate is controlled to be 1-10 Mpa; the ultrasonic generator is started at the same time, under the combined action of the pressure and the ultrasonic waves, the ultrasonic waves are transmitted to the ultrasonic cold pressing plate through the ultrasonic frequency conversion rod arranged at the upper part of the ultrasonic cold pressing plate, then the ultrasonic waves are transmitted to the composite board through the ultrasonic cold pressing plate, ultrasonic cold pressing compositing is carried out, and air reserved inside and at the upper side and the lower side of the soft cushion layer with the holes is exhausted to the outside of the composite board through the through holes 22 and the micro-holes;

the PVC composite layer prefabricated layer is manufactured firstly, secondarily the soft cushion layer is subjected to corona treatment and punching treatment, and thirdly the PVC composite layer prefabricated part, the soft cushion layer and the waterproof substrate layer are integrally composited at one time; the manufactured waterproof wear-resistant composite floor comprises the PVC composite layer prefabricated part 3 positioned on the upper layer, the soft cushion layer with the holes positioned on the middle layer and the waterproof substrate composite layer positioned on the lower layer; and the PVC composite layer prefabricated part 3, the soft cushion layer with the holes and the waterproof base material composite layer are composited into a whole;

post processing, namely, performing post processing on the raw composite board, wherein the later-stage post processing includes at least one of board sawing processing, cutting processing and chase mortise processing; and finished product of a floor, namely, performing post processing to obtain the finished product of the waterproof wear-resistant composite floor, wherein the manufactured waterproof wear-resistant composite floor comprises the PVC composite layer prefabricated part 3 positioned on the upper layer, the soft cushion layer with the holes positioned on the middle layer and the waterproof substrate composite layer positioned on the lower layer; and the PVC composite layer prefabricated part 3, the soft cushion layer with the holes and the waterproof base material composite layer are composited into a whole;

the production method of the waterproof and wear-resistant composite floor is simple in process and easy to implement; the production circle of the waterproof and wear-resistant composite floor is reduced to 24-48 hours and is reduced by 70%, the production energy consumption is reduced by 70-80%, and the production cost is greatly reduced. The waterproof and wear-resistant composite floor produced by the method has simple structure and very good waterproof and wear-resistant performances, and is not easy to bulge and layer or deform.

Embodiment II

A waterproof and wear-resistant composite floor, as shown in FIG. 1, comprises a waterproof substrate layer 1, a soft cushion layer 2, and a PVC composite layer prefabricated part 3 which is pre-manufactured and composited by a hot pressing process, wherein the PVC composite layer prefabricated part 3 sequentially comprises the PVC wear-resistant layer 31, the PVC pattern layer 32 and the PVC plastic layer 33 from top to bottom.

In this embodiment, the main structure is the same as that in the Embodiment I. FIG. 1 is the structure diagram of the first type of waterproof and wear-resistant composite floor produced by the production method provided by the invention.

The PVC composite layer prefabricated 3 is made of sheets or film materials; the PVC plastic layer 33 is made of PVC sheets or PVC film materials. The PVC composite layer prefabricated part 3 is a prefabricated part and is extremely small in thickness and has good waterproof and wear-resistant performances. The PVC composite layer prefabricated part 3 is designed, so that a plurality of surface compositing processes for the production of the waterproof and wear-resistant composite floor are reduced, the production time (production cycle) is halved, and correspondingly, the production cost of the waterproof and wear-resistant composite floor is halved.

The total thickness of the PVC composite layer prefabricated part 3 is 0.5-2.5 mm, preferably, the total thickness of the PVC composite layer prefabricated part 3 is 0.5-1.2 mm. The thickness of the PVC plastic 33 is controlled to be 0.6-1.5 mm, preferably, the thickness of the PVC plastic layer 33 is controlled to be 0.6-1.2 mm.

The soft cushion layer 3 is made of an elastic plastic layer, such as that the soft cushion layer 2 is made of EVA sheets or EVA film materials, IXPE sheets, IXPE film materials, IXPP sheets, IXPP film materials, PP sheets, PP film materials, PVC sheets, PVC film materials.

Preferably, the soft cushion layer 2 is made of the EVA sheets and the EVA film materials, the thickness of the soft cushion layer 2 is 0.5-2.5 mm, and preferably, the thickness of the soft cushion layer 2 is controlled to be 0.8-1.2 mm, so that the total thickness of the waterproof and wear-resistant composite floor can be reduced, and as a result, the cost can be reduced; and meanwhile, the balance of the waterproof and wear-resistant composite floor is improved.

Specifically, a corona surface is formed on the lower surface of the PVC composite layer prefabricated part 3 subjected to surface corona treatment, and micro-holes of which the outer ends are contraction type openings and the bottoms mutually communicate are densely distributed in the lower surface of the PVC composite layer prefabricated part 3 subjected to surface corona treatment. The upper surface and the lower surface of the soft cushion layer 2 subjected to the surface corona treatment are respectively provided with a corona surface, and the upper surface and the lower surface of the soft cushion layer 2 subjected to surface corona treatment are respectively densely provided with the micro-holes of which the outer ends are provided with contraction type openings and the bottoms mutually communicate. The diameter of the micro-holes is 0.01-0.1 mm; and the depth of the micro-holes is 0.01-0.1 mm.

The thickness of the waterproof substrate layer 1 is 3-15 mm, preferably, the thickness of the waterproof substrate layer 1 is controlled to be 4-8 mm, so that the waterproof substrate layer can be treated as a main body layer of the floor, and a chase mortise 11 is formed in the side surface. The waterproof substrate layer 1 is the waterproof composite board, and the waterproof composite board includes at least one of a wood-plastic board, a stone-plastic board and a waterproof composite wood board. Preferably, the waterproof substrate layer 1 is the waterproof composite wood board or the waterproof composite fiberboard.

A sanding surface is formed on the upper surface of the waterproof substrate layer 1 subjected to sanding treatment. Preferably, the silane coupling agent dilute is coated on the surface of the sanding surface and is baked so as to form a silane coupling agent bonding layer on the surface of the sanding surface.

The lower surface of the soft cushion layer 2 is composited onto the upper surface of the waterproof substrate layer 1 through an ultrasonic thermal compositing process, and the lower surface of the PVC composite layer prefabricated 3 is composited on the upper surface of the soft cushion layer 2 through a cold pressing process;

A grid-shaped composite material bonding layer 21 which is connected into a whole is formed in the layer below the connection surfaces of the soft cushion layer 2 and the waterproof substrate layer 1, the upper surface and the lower surface of the composite material bonding layer 21 respectively extend into the composited soft cushion layer 2 and the waterproof substrate layer 1, thus physical engaging connection effect is realized on the basis of surface adhering compositing, and as a result, the soft cushion layer 2 and the waterproof substrate layer 1 can be firmly composited and are hard to layer or deform.

A grid-shaped composite material bonding layer 21 which is connected into a whole is formed in the layer below the connection surface of the PVC composite layer prefabricated part 3 and the soft cushion layer 2; the upper surface and the lower surface of the composite material bonding layer 21 respectively extend into the PVC composite layer prefabricated part 3 and the soft cushion layer 2, and thus physical engaging connection effect is realized on the basis of surface adhering compositing, and as a result, the PVC composite layer prefabricated part 3 and the soft cushion layer 2 can be firmly composited and are hard to layer or deform.

A plurality of through holes 22 which penetrate through the soft cushion layer up and down are distributed in at least the middle area of the soft cushion layer 2. The diameter or width of the through holes 22 is 2-20 mm, preferably, the diameter or width of the through holes 22 is 5-10 mm. During compositing, air in the soft cushion layer 2 and the connection interface can be quickly exhausted through the through holes 22, so that air is prevented from reserving in the connection interface or the layer nearby, and as a result, the waterproof and wear-resistant composite floor is effectively prevented from bulging.

The side of the waterproof wear-resistant composite floor is provided with a chase mortise (11) which is only arranged on the side of the waterproof substrate layer (1). The through holes 22 are formed in areas or positions, without the chase mortises 11, on the soft cushion layer 2, and the through holes 22 are far away from the chase mortises 11.

Embodiment III

A waterproof and wear-resistant composite floor, as shown in FIG. 2, comprises a waterproof substrate layer 1, a soft cushion layer 2, and a PVC composite layer prefabricated part 3 which is pre-manufactured and composited by a hot pressing process, wherein the PVC composite layer prefabricated part 3 sequentially comprises the PVC wear-resistant layer 31, the PVC pattern layer 32 and the PVC plastic layer 33 from top to bottom.

In this embodiment, the main structure is the same as that in the Embodiment I. FIG. 2 is the structure diagram of the second type of waterproof and wear-resistant composite floor produced by the production method provided by the invention.

The upper surface and the lower surface of the soft cushion layer 2 subjected to surface corona treatment are respectively densely provided with micro-holes of which the outer ends are provided with contraction type openings and the bottoms mutually communicate. A glue layer is coated on the upper surface of the waterproof substrate layer 2, so that the lower surface of the soft cushion layer 2 can be firmly composited onto the upper surface of the waterproof substrate layer 1.

A grid-shaped composite material bonding layer 21 which is connected into a whole is formed below the connection surfaces of the soft cushion layer 2 and the waterproof substrate layer 1, the upper surface and the lower surface of the composite material bonding layer 21 respectively extend into the composited soft cushion layer 2 and the waterproof substrate layer 1, thus physical engaging connection effect is realized on the basis of surface adhering compositing, and as a result, the soft cushion layer 2 and the waterproof substrate layer 1 can be firmly composited and are hard to layer or deform.

A UV paint layer 34 is coated on the upper surface of the PVC composite layer prefabricated part, and the UV paint layer 34 enables good decoration performance and high wear resistance of the PVC composite layer prefabricated part.

A corona surface is formed on the lower surface of the PVC composite layer prefabricated part subjected to surface corona treatment, and micro-holes of which the outer ends are contraction type openings and the bottoms mutually communicate are densely distributed in the lower surface of the PVC composite layer prefabricated part 3 subjected to surface corona treatment. A glue layer is coated on the upper surface of the soft cushion layer 2, so that the lower surface of the PVC composite layer prefabricated part 3 can be firmly composited to the upper surface of the soft cushion layer 2;

A grid-shaped composite material bonding layer 21 which is connected into a whole is formed below the connection surfaces of the PVC composite layer prefabricated part 3 and the soft cushion layer 2; the upper surface and the lower surface of the composite material bonding layer 21 respectively extend into the PVC composite layer prefabricated part 3 and the soft cushion layer 2, and thus physical engaging connection effect is realized on the basis of surface adhering compositing, and as a result, the PVC composite layer prefabricated part 3 and the soft cushion layer 2 can be firmly composited and are hard to layer or deform.

A plurality of through holes 22 which penetrate through the soft cushion layer up and down are distributed in at least the middle area of the soft cushion layer 2. During compositing, air in the soft cushion layer 2 and the connection interface can be quickly exhausted through the through holes 22, so that air is prevented from reserving in the connection interface or the layer nearby, and as a result, the waterproof and wear-resistant composite floor is effectively prevented from bulging.

The side of the waterproof wear-resistant composite floor is provided with a chase mortise 11 which is only arranged on the side of the waterproof substrate layer 1. The through holes 22 are formed in areas or positions, without the chase mortises 11, on the soft cushion layer 2, and the through holes 22 are far away from the chase mortises 11.

An elastic layer 4 is composited on the bottom surface of the waterproof substrate layer 1, and the elastic layer 4 is made of a cork material composite layer, IXPE or EVA, and the thickness of the elastic layer 4 is 1-5 mm, preferably, the thickness of the elastic layer 4 is controlled to be 1-2 mm, so that the composite floor has good balance and buffering performances, and the comfort of the composite floor is improved. With the adoption of the elastic layer 4, the waterproof and wear-resistant composite floor has good sound absorption performance, the silent effect is realized.

The contents above are only the preferred embodiments of the present invention. For ordinary technicians in the art, there will be changes in the specific implementation and the scope of application according to the ideas of the present invention. The content of this specification shall not be construed as limitations of the present invention.

The invention claimed is:

1. Sound absorbing waterproof flooring planks comprising at least three layers, wherein the at least three layers comprise a first upper layer, a second core layer, and a third waterproof layer, wherein each layer having an upper planar surface and a lower planar surface, said first upper layer comprising PVC, lower planar surface of said first upper layer having a plurality of micro holes formed by a corona process;

said second core layer comprising a soft cushion material, the upper and lower planar surfaces of said second core layer having a plurality of micro holes formed by a corona process, and glue between the lower planar surface of said first upper layer and the upper planar surface of said second core layer;

the upper planar surface of said third waterproof layer having a plurality of micro holes formed by a corona process, and glue between the lower planar surface of said second core layer and the upper planar surface of said third waterproof layer, and the micro holes having a diameter and depth of from 0.01-0.1 mm.

* * * * *